United States Patent Office 3,442,117
Patented May 6, 1969

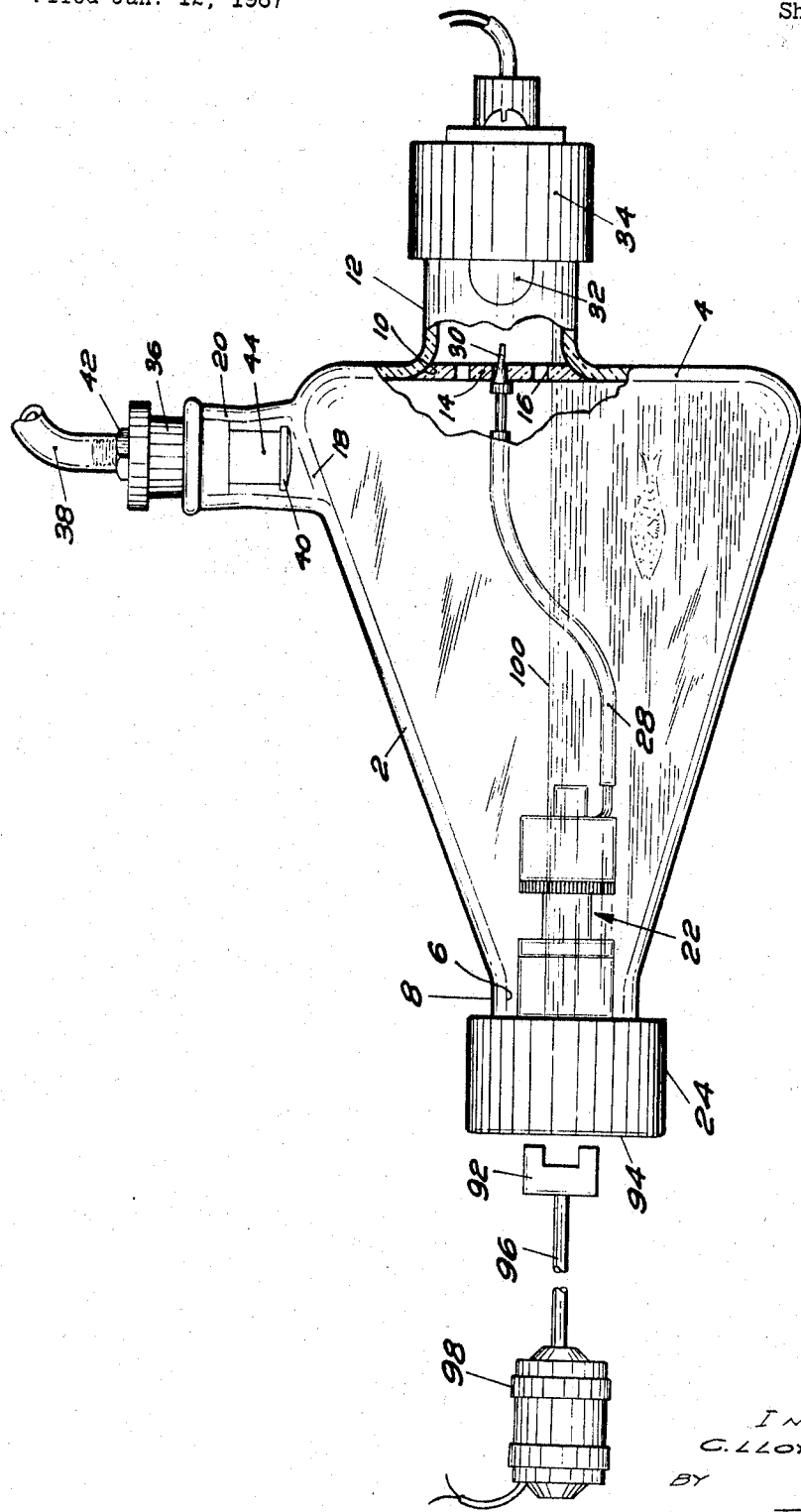

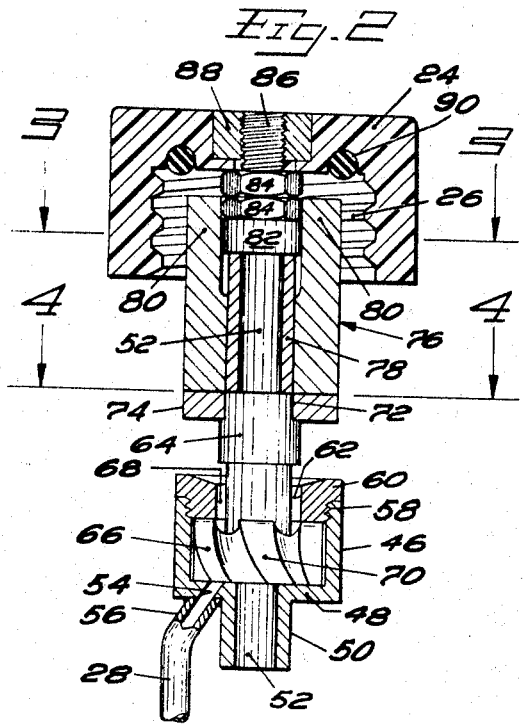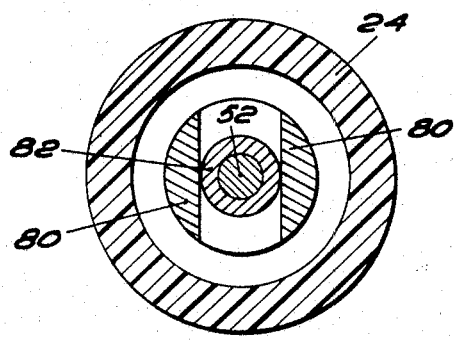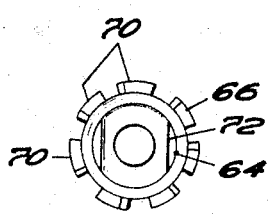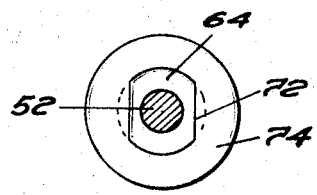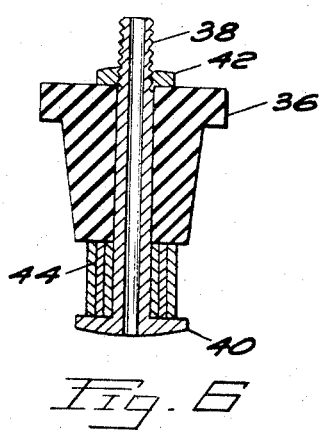

3,442,117
BIOLOGICAL FLUID BATH
Clarence Lloyd Claff, 5 Van Beal Road,
Randolph, Mass. 02368
Filed Jan. 12, 1967, Ser. No. 608,873
Int. Cl. G01n 7/00
U.S. Cl. 73—19
5 Claims

ABSTRACT OF THE DISCLOSURE

The invention consists of a container for the respirometer fluid having three openings in the container, two being approximately opposite each other in the container and the third being on top. A closure element for the opening on one side of the container supports a magnetic stirring and pumping means; the opposite opening has a closure element supporting an oxygen electrode device for measuring the oxygen tension in the fluid of the container (such as a Clark cell); and the opening on top of the container has a closure element supporting a manometer connection for measuring the gas pressure above the fluid level in the container. A tube connects the outlet of the pumping means to a nozzle which is mounted adjacent the electrode of the oxygen electrode and directs bath fluid directly against the cell. A perforated diaphragm separates the oxygen electrode device from the rest of the container so that the fish in the container will not be in contact with the cell.

---

This invention relates to fluid baths used in biological studies, particularly fish respirometers, and more particularly to such apparatus having improved aerating and stirring means therefor, and means for measuring the gas tensions of the fluid.

Attention is directed to copending application Ser. No. 608,774, filed concurrently herewith, in which there is discussed the use of fluid baths in biological work, particularly fish respirometers. It is there pointed out that it is highly desirable to disperse air throughout the bath containing the fish in order to assure equilibrium of the gasses oxygen, carbon dioxide, and nitrogen between the gas phase (air) and the liquid phase (fresh water or salt water). If the aeration is properly done, the amount of oxygen consumed by the fish from the water in the respirometer will be replaced by oxygen from the gas phase. The amount of oxygen used by the fish may be measured by a manometer which is connected to the respiration chamber, such as in a volumetric system. Such manometer measurements are more accurate if the oxygen tension overlying the water bath is kept constant with the oxygen tension in the water phase. However, as pointed out in said application, this introduces problems of getting the oxygen thoroughly dispersed in the water. In order to overcome this difficulty, various stirring means have been devised to agitate the water bath and it is one function of this invention to present an improved stirring mechanism for such baths, that is, one that is highly efficient, aerates the fluid, obviates the use of bearing packings between interior and exterior of the container, and one that can be readily disassembled for sterilizing or maintenance.

Another problem connected with the use of such biological baths is that of measuring the oxygen tension using, for example, a Clark cell. In the use of such cells, best results will be obtained if the flow of liquid in respect to the electrode cell is maintained substantially constant. It is a second object of this invention to provide means to accomplish this desired result, the means for maintaining the flow of liquid onto and away from the electrode of the Clark cell being the same means as used for dispersing oxygen or other gasses into the water bath from the gas phase above the bath.

Finally, means are provided for making a convenient manometer connection to the flask leading into the gas chamber thereof so that manometric measurements may be readily made, this means also providing a means for maintaining KOH suspended above the fluid bath for the removal of $CO_2$.

The invention also provides apparatus incorporating the above mechanisms, all of which may be readily dismounted and cleaned, including rendering them biologically sterile such as by autoclaving, the various parts of the apparatus being easily disassembled, cleaned, sterilized, and then reassembled for use.

Summarizing, therefore, among the several objects of the invention may be noted the provision of a fluid bath for the study of fish which incorporates means for producing a rapid rate of equilibration between the gas phase (air) and the water phase (liquid); the provision of a bath of the above class which includes improved stirring means, but in which the stirring means are so constructed as to eliminate any sealing problems for the bath; the provision of pumping means incorporated with the stirring means for pumping the bath fluid directly to the electrode of an oxygen tension measuring device; the provision of a fish respirometer incorporating the above features but in which the volume of oxygen or air overlying the bath of the respirometer is kept at a minimum, the apparatus providing stirring and pumping mechanisms of the aforesaid classes by means of which oxygen is thoroughly dispersed through the fluid of the bath at a rapid rate; and the provision of a bath of any of the aforesaid classes or combinations thereof which is easily disassembled and assembled, simple to use, and economical to manufacture and maintain. Other objects and advantages will be in part obvious and in part pointed out hereinafter.

The invention accordingly comprises the elements and combinations of elements, features of construction, and arrangements of parts, all of which will be exemplified in the structures hereinafter set forth, and the scope of the application of which will be indicated in the appended claims.

In the accompanying drawings, in which one of the various possible embodiments of the invention is illustrated:

FIG. 1 is an elevation, partly in section, of the embodiment;

FIG. 2 is an enlarged sectional elevation of a combined stirring and pumping mechanism of this invention;

FIG. 3 is a sectional (view) of the FIG. 2 apparatus, taken in the direction of sight lines 3—3 thereon;

FIG. 4 is a view of the FIG. 2 apparatus taken in the direction of sight lines 4—4 thereon;

FIG. 5 is a plan view of an impeller used in the FIG. 2 apparatus; and

FIG. 6 is a sectional view of another portion of the apparatus utilized for making manometric connections.

Throughout the drawings, similar reference characters indicate corresponding parts. Dimensions of certain of the parts as shown in the drawings may have been modified and/or exaggerated for the purposes of clarity of illustration.

Referring to FIG. 1, there is shown a fish respirometer comprising a cone-shaped flask 2 preferably of glass although it may be made, in some cases of transparent plastic. The flask is shown as being horizontally mounted with its base 4 vertically arranged, in order to minimize the gas space above the bath fluid. The flask has three openings, the first of these being the opening 6 at the apex of the flask which extends outwardly as a neck 8. The second opening 10 is formed in the vertical wall 4 of the flask, and is provided with an outwardly extending neck 12. Across the opening 10 there is provided a perforated diaphragm 14, the diaphragm having a plurality of holes 16. The diaphragm 14 may conveniently be made of glass if the flask 2 is of glass, and may be either fused to the glass in order to provide a unitary structure, or if desired, it may be separately held in place. The third opening 18 is in the uppermost portion of the flask wall, and preferably lies adjacent to the uppermost portion of the vertical wall or base 4. Opening 18 is provided with the outwardly extending neck 20.

A combined stirring and pumping device indicated generally by numeral 22 and which will be described more fully below, is supported on the closure element 24, the latter being a cap which is attached to the neck 8 by means of screw threads 26 (see FIG. 2) in conventional manner. A tube 28 connects the outlet of the pumping means 22 to a nozzle 30 which projects through one of the holes in the diaphragm 14 in such position as to direct fluid emerging therefrom against the electrode 32 of an oxygen cell, for example, a Clark cell. The Clark cell (which is not further illustrated herein since it is conventional) is supported by a screw cap 34 which in conventional manner screws onto the neck 12.

Mounted in the neck 20 is a stopper 36, preferably made of rubber, through which extends the end of a tubular manometer connection 38. The inner end of tube 38 (see FIG. 6) is provided with a flange 40, and the outer end of the tube is threaded as shown. A lock nut 42 holds the tube securely within the stopper. Around the inner end of tube 38, between the flange 40 and the inner end of the stopper, there are wrapped several layers of blotting paper 44 on which some drops of KOH may be placed in order to absorb any $CO_2$ in the gas space above the fluid level of the respirometer.

Referring now to FIGS. 2–5, the combined stirring and pump mechanism 22 comprises a cylindrical housing 46 which is preferably made of stainless steel, as are the other metallic parts of the pump (other than the permanent magnet). The housing has a closed end 48 from which extends boss 50. Into the latter is fastened an axle 52 which is concentric with the cylinder and extends upwardly (as viewed) in FIG. 2. The axle may be held in boss 50 by conventional means such as welding or a threaded engagement. An orifice 54 in end 48 has attached thereto as by welding a nipple 56 to which is connected one end of the tube 28. The otherwise open end of cylinder 46 is provided with inner threads 58 into which is screwed a closure element 60, the latter having an aperture or hole 62 therethrough.

Rotatably mounted on the axle 52 is an impeller structure comprising an extending sleeve 64 and an impeller element proper 66. The total impeller 64–66 can conveniently be molded or milled from a durable plastic such as nylon. The sleeve passes freely through hole 62, and adjacent the hole the sleeve is provided with a section of reduced diameter so as to allow a clearance 68 between this section and hole 62 for the passage of water and gasses from the outside of the housing to the inside. The impeller element proper 66 is fluted to provide impeller blades 70, the latter being inclined at an angle to the axis of the impeller so that when the impeller is rotated, the blades will gather fluid and gasses from the inlet side of the housing via clearance 68 and force them out of the housing through the orifice 54 and tube 28. The upper end of the sleeve 64 is provided with a squared off shoulder 72 (see FIGS. 2 and 4) and fitted onto the shoulder is an iron washer 74.

A permanent magnet 76 is rotatably mounted on axle 52 by means of a bearing 78 which is press fitted into the magnet. The magnet has the upwardly (as viewed) arms 80 so that the resulting magnet structure is U-shaped. A spacer 82 is slidably mounted on the axle 52. The upper end of axle 52 is threaded as shown, and a pair of lock nuts 84 serve to position the spacer, magnet, washer 74, and impeller 64–66 in relationship to the closed end of the housing 46 so as to allow free rotation of these parts with a minimum of endplay. The threaded end 86 of the axle screws into a metallic insert 88 which is molded in a plastic cup-shaped cap 24, the cap being screwed into the threaded end 86 until the insert 88 abuts against the lock nuts 84 firmly. If desired, cap 24 may be made of brass or other non-magnetic metal, and in this case, insert 86 may be omitted, threaded end 86 then engaging threads cut into the cap itself.

With the parts mounted as shown in FIG. 2, the engagement of the washer 74 with the bottom face of the magnet 76 serves as a magnetic clutch. Of course, if desired, the magnet 76 could be so formed as to engage the shoulder 72 of the impeller directly, without the intervention of the washer 74, the latter then being omitted.

In order to seal the cap 24 against the end of neck 8, a typical O-ring 90 of rubber is suitably positioned against the inner face of the cap.

In order to drive the pump 22, an external permanent magnet 92 is provided, the latter being U-shaped and having the ends of its arms mounted in close proximity to the outer face 24 of the closure cap 24. The magnet 92 is conventionally mounted on the end of the shaft 96 of an electric motor 98.

Thus, it is seen that the advantages of the invention are provided by the above construction. The liquid level 100 in the flask is preferably positioned so that a portion of the hole 62 is exposed to the gas above the level of the liquid. When the motor 98 is operated, the interaction of the fields of the magnets 92 and 76 is such that the latter will be rotated by the magnet 92. This in turn rotates the impeller 66 which will suck in gas and liquid through the clearance 68, this mixture of gas and liquid being then pumped through orifice 54 and into the tubing 28, from whence it is delivered by nozzle 30 against the electrode 32 of the Clark cell. The fluid thus delivered returns to the liquid bath by means of the holes or orifices 16. It will be noted that because of the agitation of the impeller, the gas that is sucked therein is broken up into many fine bubbles, and thus there is a thorough mixing of the gas and liquid of the bath.

In FIG. 1, the oxygen electrode device 34 is indicated only schematically, since the construction of such devices is well known in the art. In addition to the electrode 34 being held in the cap as shown, a thermistor may be also located in the cap in such position as will be always submerged in the liquid level of the bath. The leads from this thermistor may then extend through the cap and thence to a bridge-type meter whereby the temperature of the liquid bath may be measured during use.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. A fish respirometer comprising a container for holding a fluid at a predetermined level with a gas-filled space thereabove, the container having a first opening at one side, a second opening in another side at approximately the same height as the first opening, and a third opening at the top; first means at the first opening for mixing said gas in the fluid and for pumping the latter; second means at the second opening for measuring the oxygen tension of fluid within the container; third means at the third opening for measuring the pressure of gasses within the container above the fluid surface; and tubular means having one end connected to the outlet side of said pumping means within the container and its other end mounted adjacent said second means, whereby said fluid is forced by the first means directly into contact with said second means.

2. The respirometer of claim 1 in which a perforated diaphragm extends across the second opening, and said second means is positioned to one side thereof remote from said first means, said other end of the tubular means projecting through the diaphragm.

3. The respirometer of claim 1 in whch said first means comprises a cylindrical housing; an axle coaxially mounted by one end in the housing; an impeller rotatably mounted on the axle within the housing; a U-shaped permanent first magnet rotatably mounted on the axle outside the housing; and connecting means on the axle operatively connecting the first magnet and impeller; the housing, axle, impeller, magnet and connecting means all being mounted within the container; a liquid-tight closure element closing said first opening and holding the first means; and a second magnet rotatably mounted outside the container in position to have its magnetic field interact with the field of the first magnet to rotate the latter as the second magnet rotates.

4. The respirometer of claim 3 in which said cylindrical housing is at least partly submerged in the field and the said one end of the tubular means connects with the interior of said housing below said predetermined level.

5. The respirometer of claim 3 in which the container comprises a conically shaped flask mounted with its base vertical, the first opening being at the apex of the flask, the second opening being in the vertical end wall of the flask, and the third opening being in the uppermost portion of the wall of the flask, and each of said openings having an exteriorly extending neck; said first means being mounted within the neck of the first opening by said closure element; the second means being mounted within the neck of the second opening; the third means being mounted within the neck of the third opening; and a perforated diaphragm lying across the second opening where the neck of the latter joins the rim of the opening.

References Cited

FOREIGN PATENTS 1,060,628 2/1954 Germany.
1,193,703 6/1963 Germany.

RICHARD C. QUEISSER, *Primary Examiner.*

C. E. SNEE III, *Assistant Examiner.*

U.S. Cl. X.R.

43—57; 119—1; 128—2.05